Figure 1:
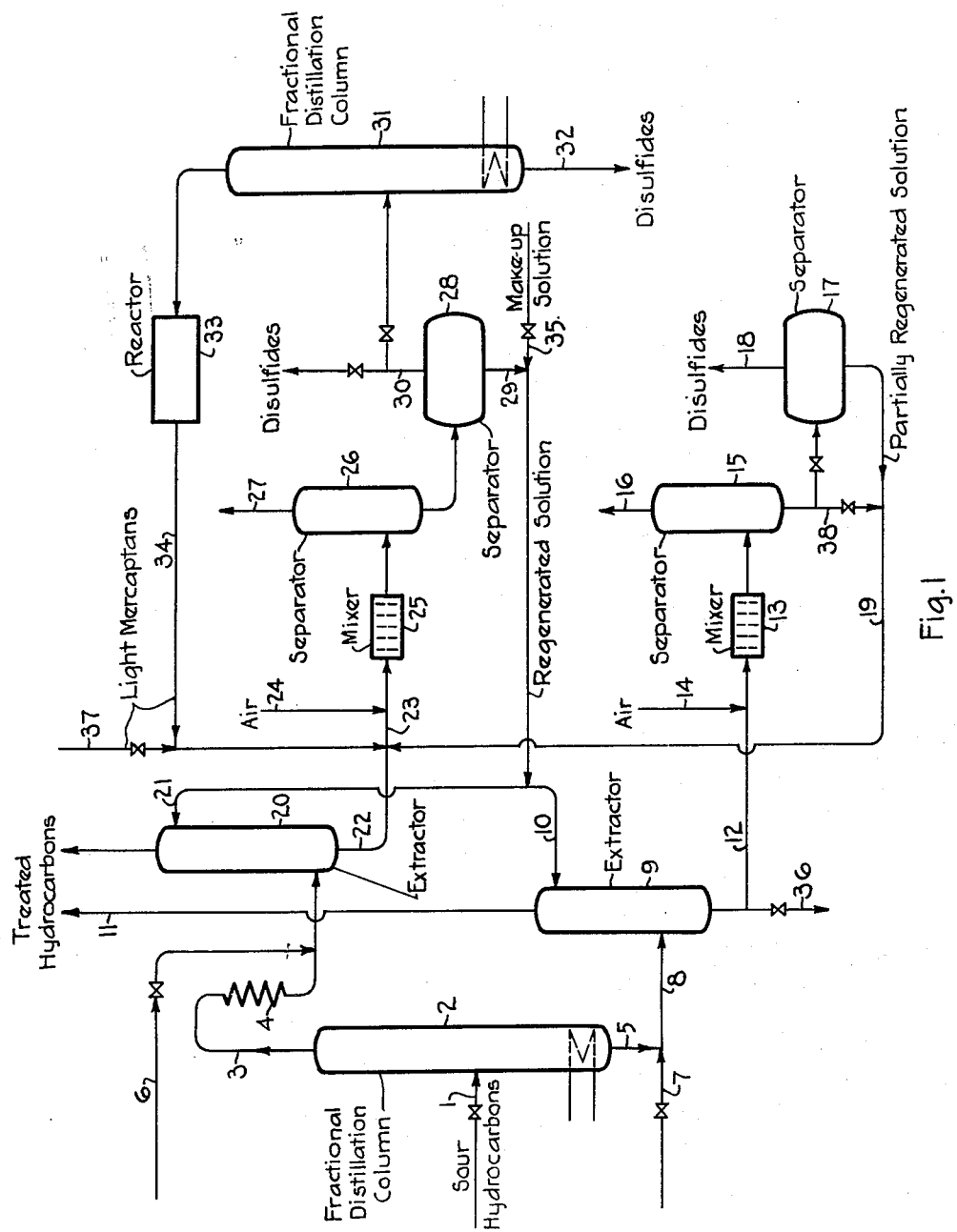

United States Patent Office

2,760,909
Patented Aug. 28, 1956

2,760,909

PROCESS FOR THE REGENERATION OF CAUSTIC ALKALI SOLUTIONS CONTAINING MERCAPTANS

Ernest W. Zublin, Los Gatos, Calif., assignor to Shell Development Company, San Francisco, Calif., a corporation of Delaware Application April 15, 1944, Serial No. 531,248

1 Claim. (Cl. 196—32)

This invention deals with an improvement in the regeneration by oxidation of spent or partially spent caustic alkali solutions containing absorbed mercaptans, such as the solutions which have been obtained in treating sour hydrocarbon oils containing mercaptans, and more particularly is concerned with their regeneration by air blowing in the presence of dissolved organic catalysts which promote the oxidation of mercaptides to disulfides. Specifically it is concerned with the regeneration of spent solutizer solutions.

It is known that methyl and ethyl mercaptans can be extracted fairly completely by aqueous solutions of caustic alkali, e. g. aqueous NaOH or KOH, from their solutions in hydrocarbon oils. Higher mercaptans can be extracted but incompletely if at all, unless a so-called solutizer is contained in substantial amounts in the aqueous caustic alkali.

The process (of which this invention is an improvement) is carried out by contacting a sour hydrocarbon distillate containing mercaptans of different molecular weights with an aqueous solution of caustic alkali. Treated distillate and spent caustic solution containing absorbed mercaptans (mostly in the form of mercaptides) are separated from each other, and the latter is regenerated by oxidation in the presence of a water-soluble, dissolved, organic catalyst for the conversion of mercaptides to disulfides. Oxidation by blowing with air or other oxygen-containing gas (including pure oxygen) is preferred. Part or all of the regenerated solution is then returned to further treat sour distillates and to extract mercaptans therefrom. The caustic alkali solution may contain a solutizer.

It is thus a purpose of this invention to regenerate an aqueous caustic alkali solution used in extracting mercaptans from sour hydrocarbon distillates, by oxidation with air or other oxygen-containing gas in the presence of an organic catalyst, in a manner to yield a regenerated solution of the lowest possible re-entry value at the least expense of oxidized catalyst. It is another purpose catalytically to oxidize high molecular weight mercaptans in a spent caustic alkali solution in preference to lower ones, so as to leave a residual mixture of mercaptans in the regenerated solution in an amount sufficient to protect the catalyst, said mixture being poor in relatively heavy mercaptans. Still another purpose is to devise a method for extracting mercaptans efficiently and economically with aqueous caustic alkali, wherein spent aqueous solution is regenerated by catalytic air oxidation, and wherein a better than normal extraction efficiency is obtained with little loss of catalyst.

The invention comprises in one of its main aspects extracting with an aqueous solution of caustic alkali (which may contain a solutizer) relatively heavy mercaptans from a sour hydrocarbon distillate containing them. From the resulting spent solution a portion of the mercaptans is removed, preferably by pre-oxidizing with air or similar oxygen-containing gas in the presence of a suitable dissolved organic catalyst to a low mercaptan-sulfur level, leaving a residual marcaptan-sulfur content sufficient only to give adequate protection to the catalyst. Lighter mercaptans are added to the oxidized solution and the resulting mixture is further oxidized to a minimum safe mercaptan level. The regenerated solution from the first oxidation has a relatively high re-entry value, while after the second oxidation the re-entry value is much lower even though the mercaptan-sulfur content may have been the same in both cases. The regenerated solution from the second oxidation is then returned for further extraction of mercaptans.

Addition of light mercaptans to the solution may be achieved in one of several ways. For example, one may merely introduce a small amount of light mercaptans from any source into the caustic solution used originally to extract heavy mercaptans, and thereafter continue the oxidation. Or the once oxidized solution of heavy mercaptans may be combined with a spent caustic alkali solution resulting from the treatment of sour hydrocarbon distillates containing predominantly light mercaptans to result in a mixture which is further oxidized.

The term light or low molecular weight mercaptans as herein used refers in general to mercaptans of 3 and less carbon atoms, although this limitation is not critical insofar as the benefits of the improvement of this invention are concerned. Thus the light mercaptans may on the one hand include $C_4$, $C_5$ or even heavier mercaptans, or on the other hand exclude the propyl mercaptans. Heavy or high molecular weight mercaptans are those having more carbon atoms than the light ones defined above.

The term "re-entry value" defines the amount of mercaptan-sulfur content which is returned to a gasoline upon contact with a regenerated solution. It is determined by shaking about equal volumes of mercaptan-free gasoline and regenerated caustic solution at about room temperature, separating the resulting layers and determining the mercaptan-sulfur content in the separated gasoline layer. In order to produce doctor sweet gasoline by extraction with a regenerated caustic alkali solution, the re-entry value must be below .0004% S.

Solutizers are water-soluble, oil-insoluble substances which promote the solubility of mercaptans in aqueous caustic alkali. A large number of substances can be used for this purpose, among which the following are outstanding: lower mono and poly hydric alcohols, lower aliphatic poly amines and alkanolamines, hydroxy or amino ethers, hydrocarbon carboxylic acids such as fatty acids of 2 to 6 carbon atoms and dicarboxylic acids of 5 to 6 carbon atoms, phenols having up to 10 carbon atoms, etc. Preferred are the phenols and the lower fatty acids having from 3 to 5 carbon atoms, particularly isobutyric acid, or mixtures thereof. If acids are used as solutizers, it is understood that they are contained in the solution in the form of their alkali metal salts.

Water-soluble, organic substances known to catalyze mercaptide oxidation are members of the class of hydroxy and amino phenols, which if desired may contain various other substitution radicals, preferably one or more carboxyl radicals. U. S. Patent 2,015,038 discloses a number of such catalysts. Preferred, however, are tannic acid, tannin and various other condensed poly hydroxy benzoic acids. These catalysts may conveniently be employed in concentrations of about .2 to 5% by weight, preferably about .5 to 2%. As the rate of mercaptide to disulfide conversion is a direct function of the catalyst concentration, it would appear desirable to employ relatively high catalyst concentrations. However, opposed to this is the fact that the rate of catalyst oxidation follows a similar function. Hence there is a need for maintaining the concentration between the fairly narrow limits indicated.

The presence of mercaptides inhibits the oxidation of the catalyst, the protective effect decreasing with reduced mercaptide content. This is an important fact, as will be seen later.

Operating conditions are in general as follows:

Temperature of extraction 32° to 120° F., extraction efficiency increasing with decrease in temperature.

Temperature of oxidation about 60° to 150° F., preferably about 80° to 125° F.

Pressure during oxidation substantially atmospheric, sufficient only to overcome natural back pressures of equipment; however there are no particular objections other than inconvenience to using higher or lower pressures.

Amount of oxygen normally employed is about 3–15 cu. ft. (Standard conditions) per barrel of distillate.

Time of contact sufficient to cause substantial conversion of mercaptides to disulfides, but leaving a residual mercaptan content sufficient to protect the catalyst from being oxidized rapidly. As the rate of mercaptan conversion is a function of catalyst concentration and temperature, no hard and fast rule can be laid down to state the exact time of contact required. Typical rates of mercaptan-sulfur reductions are shown by way of illustration in Table I below:

Table I

| Catalyst Concentration, Wt. Percent | Reduction in Mercaptan-Sulfur Content, Percent S/Minute When Using— | | |
|---|---|---|---|
| | Tannic Acid | Tannin | Hydroquinone |
| 0 | .001 | .001 | .001 |
| .25 | .07 | .09 | .11 |
| .50 | .09 | .16 | .19 |
| 1.0 | .16 | .21 | .25 |
| 3.0 | .18 | .35 | |

The rate of catalyst oxidation is an inverse function of the mercaptan-sulfur content. Economical considerations which take into account the cost of replacing oxidized catalyst, thus place a definite lower limit on the residual mercaptan content of caustic alkali solutions regenerated by this method. The minimum residual mercaptan-sulfur content which must be maintained in order to afford protection of catalyst varies from about 0.1 to 1.0%, depending upon the nature of the catalyst and its concentration. The figures below illustrate this point:

Table II

| Concentration, Wt. Percent of Catalyst | Minimum Percent Mercaptan Sulfur Concentration Required for Protection When Using— | | |
|---|---|---|---|
| | Pyrogallol | Hydroquinone | Tannic Acid |
| .25 | .35 | | |
| .50 | .45 | .55 | .20 |
| 1.0 | .60 | .55 | .20 |
| 1.5 | .75 | .65 | .20 |

On the other hand, residual mercaptans in a regenerated solution impair its extraction power for mercaptans. Extraction cannot proceed beyond the equilibrium distribution of mercaptans between the hydrocarbon and aqueous phases, and the higher the residual mercaptan content, the more mercaptans will remain in the hydrocarbon oil. From this point of view, it is desirable to bring the residual mercaptan content to the lowest possible figure. Obviously a balance must be struck between the two opposing demands, and in general the conditions of oxidation will be such to reduce the residual mercaptan content to the very minimum which can be reached without excessive catalyst loss.

The total residual mercaptan content of the regenerated solution, however, is not the sole criterion for gauging the efficiency of the latter in extracting mercaptans. The molecular weights as well as the structures of the residual mercaptans must be taken into consideration. In order to result in a given extraction efficiency (as measured by the re-entry value) regenerated caustic solutions can tolerate a larger content of relatively low molecular weight mercaptans than higher molecular weight mercaptans.

As indicated above, the requirements for catalyst preservation and low re-entry value are diametrically opposed. However, since catalyst preservation is a function of total mercaptan-sulfur content only, while re-entry value depends upon mercaptan-sulfur content as well as on molecular weights of mercaptans, it is possible to carry out the regeneration in a manner so that for a given minimum consumption of catalyst a lower ren-entry value can be secured than is normally possible. This can be achieved by preferentially oxidizing the relatively heavy mercaptans.

Figure 2:
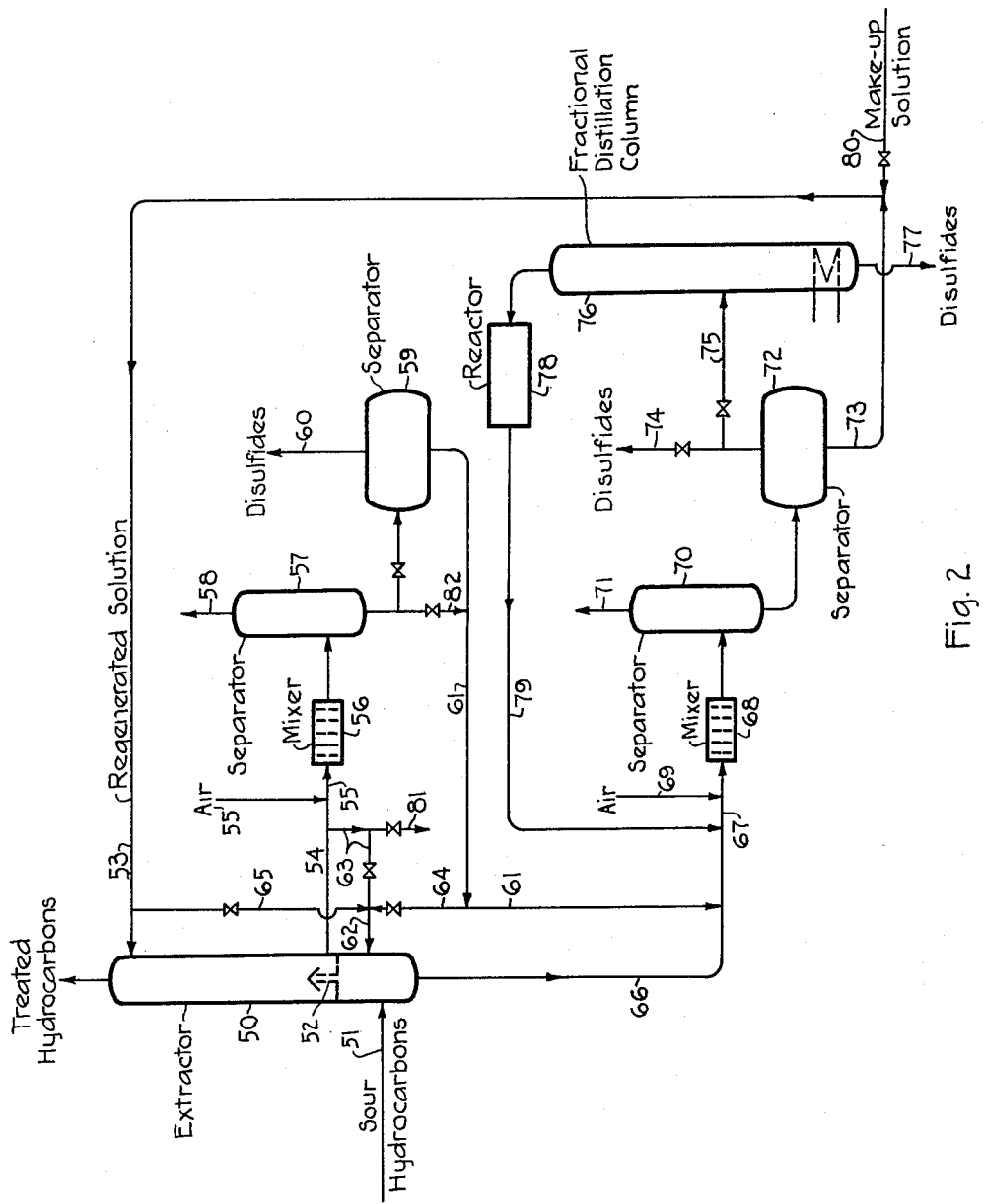

Figures 1 and 2 of the drawing show two flow diagrams of different modifications. In the process of Figure 1, the light and heavy mercaptans are contained in two separate distillate streams; while in the process of Figure 2 the light mercaptans are pre-extracted and the heavy ones are thereafter removed from a single distillate.

Referring to Figure 1, sour hydrocarbon distillate containing mercaptans of different molecular weights including $C_2$ to $C_4$ mercaptans, enters fractional distillation column 2 through line 1, where it is separated into a light and heavy fraction. The light fraction passes out through vapor line 3 and is condensed in condenser 4, and the heavy fraction is withdrawn through bottom line 5. Fractional distillation is advantageously conducted so that $C_3$ and lighter mercaptans accumulate in the top fraction, while the $C_4$ and heavier mercaptans remain in the bottom fraction, although there is considerable leeway. For instance, most of the $C_3$ mercaptans may remain in the bottom product if a sufficient supply of $C_1$ and/or $C_2$ mercaptans is available. Again, a considerable portion or all of the $C_4$ mercaptans may be taken overhead. Alternatively, if two mercaptan distillates are available corresponding approximately to the above-described fractions, for example one rich in $C_3$ and lighter mercaptans and the other poor in $C_3$ and lighter mercaptans but containing heavier mercaptans, they may be substituted for the light and heavy fractions produced in column 2 and may be introduced through lines 6 and 7 respectively.

The heavy fraction or its corresponding distillate proceeds through line 8 to extractor 9 where it is extracted with regenerated solutizer solution containing an oxidation catalyst for mercaptans, the solution being introduced into the top extractor 9 through line 10. Treated distillate is withdrawn through line 11.

Spent solutizer solution containing heavy mercaptans passes through line 12 to mixer 13, where a measured amount of air, introduced through line 14 just ahead of the mixer, is thoroughly admixed with the distillate. Spent air is released in air separator 15 and vented through line 16. Oxidized solutizer solution goes to settler 17, where disulfides rise to the top and may be withdrawn through line 18. If desired, separator 17 may be by-passed through by-pass 38.

The amount of air admitted through line 14, and the time and temperature maintained in mixer 13 are such to allow maximum conversion of mercaptides to disulfides without causing excessive loss of catalyst. As stated earlier, a residual mercaptan-sulfur content between about .1 and 1% must be left in the solution. Since the mercaptans in the solution are relatively heavy, the re-entry value of the regenerated solution is too high to permit satisfactory re-use of the latter for further extracting mercaptans. It is therefore considered that this solution in separator 17 is only partially regenerated.

From separator 17 the solution now proceeds through line 19 to a second air regeneration system where it is further oxidized in conjunction with a second mercaptan solution containing light mercaptans obtained by extracting condensate from condenser 4 or distillate from line 6, in extractor 20 with solutizer solution introduced thereinto through line 21. This second mercaptide solution emerges from extractor 20 through line 22 and joins the partially regenerated solution from line 19 in line 23. Air is admitted through line 24 in the necessary amount to cause conversion of mercaptides to disulfides, leaving a residual mercaptan-sulfur content sufficient only to protect the catalyst. The combined solutions are thoroughly contacted with the air in mixer 25. Spent air is released in separator 26 and is vented through line 27. Oxidized solution passes to settler 28 where disulfides are allowed to rise to the top. Regenerated solution proceeds through line 29 to the junction of lines 10 and 21 where it is split into two fractions, one going to extractor 9 and the other one to extractor 20.

The disulfides in separator 28 are withdrawn through line 30 and may be discarded. If desired, they may, however, be frictionally distilled in fractionator 31 to separate the light from heavier disulfides, it being convenient to take the $C_5$ and lighter disulfides as top product while leaving the $C_6$ disulfides as bottom product, although there is some leeway on the cut point. For instance, the $C_5$ disulfides may go into the bottom product, or else the $C_6$ may remain in the top product. The bottom product is discarded through line 32. The top product passes through a reactor 33 where the disulfides are reduced to mercaptans, for example, by hydrogenation over a sulfur-immune catalyst such as molybdenum sulfide, tungsten sulfide, tungsten nickel sulfide, etc. The resulting mercaptans consisting essentially of $C_3$ and/or lighter mercaptans, are then returned through line 34 to the combined solutions in line 23 for the purpose of raising in them the ratio of light to heavy mercaptans. This in turn makes possible the obtainance of a regenerated solutizer solution of still lower re-entry value without loss of catalyst.

If desired, light mercaptans from any source may be introduced through line 37, and they may be the only means employed to raise the light to heavy mercaptan ratio in the partially regenerated solution in lines 19 and 23. In this case extractor 20 is not in operation.

Makeup solutizer solution may be admitted to line 21 through line 35, while foul solution may be conveniently withdrawn from the system through line 36 branching from line 12 at the botom of extractor 9.

In Figure 2 a flow diagram is shown of a similar process which, however, does not require two separate sources of mercaptans. Sour hydrocarbon distillate containing a mixture of mercaptans including $C_3$ as well as lighter and heavier mercaptans is admitted to the bottom of extractor 50 through line 51. This extractor is divided into two portions by blank plate 52 which permits liquid to flow upward but not downward. Solutizer solution is introduced to the top of the extractor through line 53 to flow countercurrently to the rising hydrocarbon distillate. Descending solution is taken off at tray 52 through line 54 and at least a major portion thereof proceeds through line 55 to mixer 56 where it is contacted with a controlled amount of air admitted to line 55 through line 55'. This amount and conditions of oxidation again are such to convert mercaptides to disulfides, leaving enough residual mercaptan-sulfur to inhibit the excessive oxidation of the catalyst. Spent air is released in the separator 57 and is vented through line 58. Oxidized solution passes to separator 59 where disulfides are skimmed off and are discarded through line 60. If desired, separator 59 may be by-passed through by-pass 82.

The oxidized solution is withdrawn through line 61 and is further oxidized in conjunction with a mercaptide solution containing predominantly very light mercaptans, the latter solution being produced as follows:

A relatively small amount of solutizer solution, i. e. an amount less than half of that introduced into the top of extractor 50, is admitted to this extractor through line 62 at a point just below plate 52. This amount is obtained from any one or all of the following sources: (1) it may be a portion of the solution leaving extractor 50 above plate 52 through line 54. This portion, if used, is conducted through lines 63 and 62. (2) it may be a portion of the oxidized solution in line 61 brought in via lines 64 and 62. (3) it may be a portion of regenerated solution from line 53 admitted through lines 65 and 62.

This portion, whatever its source, flows countercurrently to the sour hydrocarbon distillate in the lower end of an extractor 50 below the plate 52. Since the ratio of solutizer solution to distillate is relatively low, light mercaptans are preferentially extracted. Thus the spent solution which is withdrawn from the bottom of the extractor 50 through line 66 is rich in light mercaptans, but contains few relatively heavy ones.

This portion of the spent solution is now combined in line 67 with the oxidized solution from line 61 (except that portion of the latter which may have been taken through line 64). The resulting mixture is contacted in the mixer 68 with air admitted through line 69. Spent air is released in separator 70 and vented through line 71. The amount of air and conditions of contact are again so controlled to cause oxidation of mercaptides to disulfides leaving a mercaptan-sulfur content sufficient for the protection of the catalyst. The oxidized solution is settled in separator 72 and regenerated solution returns through bottom line 73 and line 53 to the top of extractor 50 (except that portion which may be taken through line 65).

Disulfides in separator 72 may be discarded through line 74 of else may be taken through line 75 to be fractionally distilled in fractionator 76 to separate low boiling from high boiling disulfides. Conveniently, the fractionation is controlled such that $C_5$ and lower disulfides go overhead, while $C_6$ and heavier remain in the residue. The latter is discarded through line 77. The overhead is reduced to mercaptans in extractor 78, for example, by hydrogenation over a sulfur-immune catalyst. Resulting mercaptans consisting essentially of $C_3$ and lighter are then returned through line 79 to the combined solution in line 67 to raise its light to heavy mercaptan ratio.

Makeup solution may be introduced through line 80, while foul solution may be discarded through line 81.

In the foregoing description of the flow diagram pumps, by-passes, auxiliary vessels, heat exchangers, reboilers, coolers, etc. have not been shown. However, their placement is within the skill of the designer for chemical engineering equipment. Extractor 50, while shown as a single unit divided by plate 52, may, if desired, be built as two separate units connected by the necessary piping equivalent to the plate. Likewise the two oxidizing units comprising air intakes, mixers, separators and settlers may be combined into a single unit, for instance in the form of a suitable tower with one or several air intakes at different levels, heavy mercaptide solution entering at the top and light mercaptans or mercaptides being introduced at a lower level.

Hydrocarbon oils which may be treated by the described process are principally distillates boiling within gasoline range or a fraction thereof, although liquefied propane, propylene, butanes, butylenes, pentanes, amylenes, etc. may be a convenient source for light mercaptans. If desired, kerosene or fractions thereof may also be treated. Distillates may be derived from petroleum or coal, and may be straight run, cracked, hydrogenated, isoformed, hydroformed, or synthetically produced, as by alkylation, polymerization, etc.

It is desirable, though not always essential, to pre-remove from the distillates part or all of the acids having dissociation constants above about $10^{-8}$, in particular $H_2S$, $CO_2$ and carboxylic acids, i. e. lower fatty acids, naphthenic acids, etc. Methods to accomplish this are well known, and usually involve the pre-treatment with an aqueous caustic alkali solution preferably substantially free from solutizer for mercaptans. Depending on the concentration and the amount of the aqueous caustic pretreating solution employed, light mercaptans, primarily methyl and ethyl mercaptans, may be pre-removed simultaneously. This may result in a deficiency of light mercaptans in the main treating solution with consequential difficulties in air oxidation. It may therefore be advantageous to recover at least a portion of these mercaptans as by steam stripping, or springing them with $H_2S$, $CO_2$ or other acid, and then utilizing them in the second oxidation stage as hereinbefore described.

If desired, simultaneous pre-removal of light mercaptans can be minimized or avoided by pre-treating with a relatively dilute solution well loaded with light mercaptides and salts of stronger acids, e. g. sulfides, carbonates, etc. This may be accomplished by recirculating the solution through one or several mixers and settlers in contact with raw sour distillate. A small amount of fresh caustic may continuously be added to the solution and an equivalent amount of spent caustic may be withdrawn.

Figure 3:
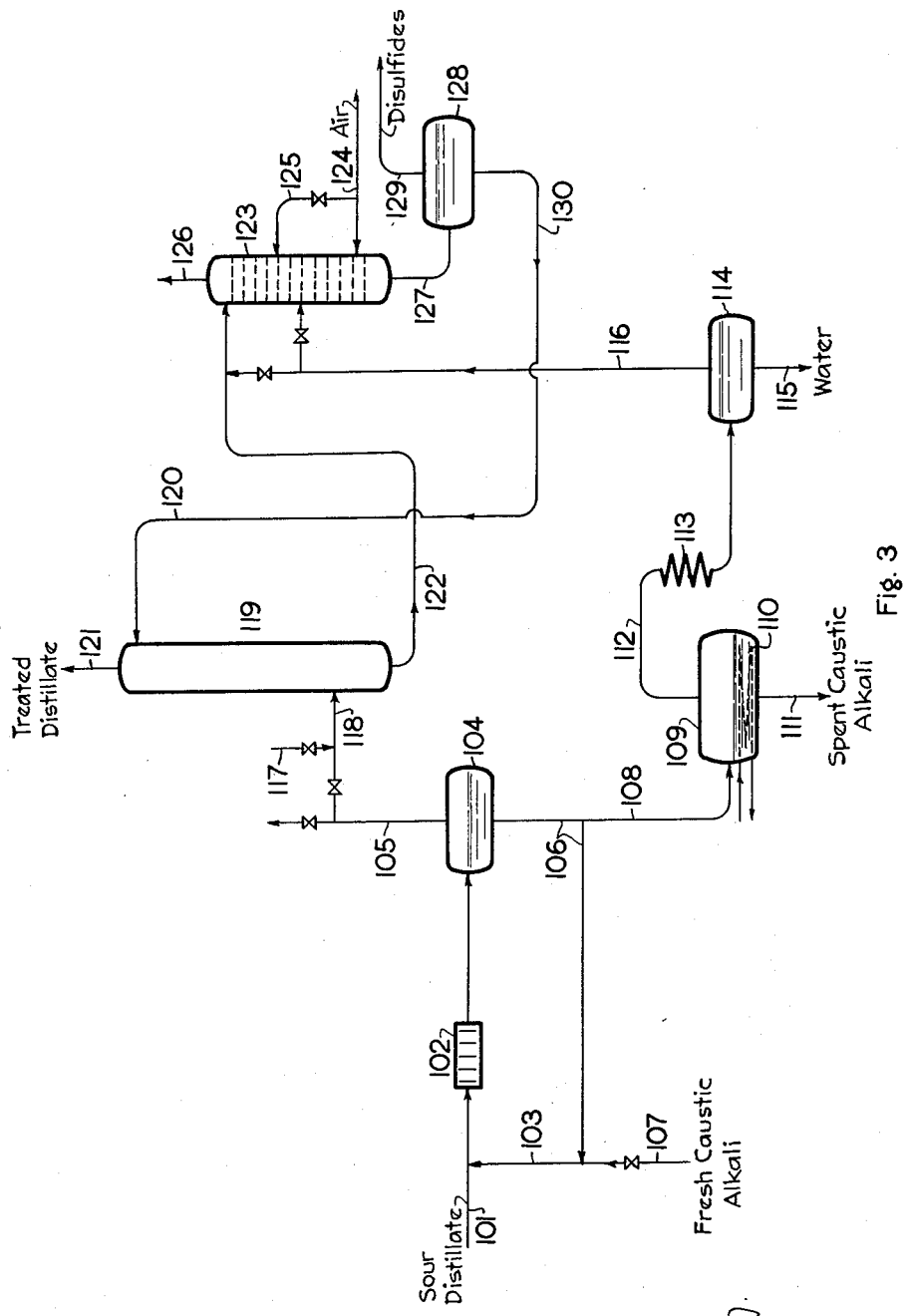

A flow diagram illustrating the above is shown in the drawing, Figure 3. Sour hydrocarbon distillate containing mercaptans including light ones, enters mixer 102 through line 101 to be pre-treated with an aqueous alkaline solution introduced through line 103. The mixture is separated in separator 104, distillate being removed through line 105 and aqueous solution being returned at least in part through lines 106 and 103 to the mixer 102. A small amount of fresh aqueous caustic alkali is introduced through line 107 into line 103, and an equivalent amount of spent solution is withdrawn from line 106 through line 108. This amount is controlled so as to effect removal from the distillate of substantially all acids having dissociation constants above about $10^{-5}$, together with at least some of the light mercaptans, and to result in a spent aqueous solution well loaded with acids though still reacting alkaline.

The portion of the spent solution in line 108 is taken to boiler or stripper 109 equipped with heating coil or open steam line 110. There, light mercaptans are boiled off, or stripped out with steam. Remaining solution is discarded through line 111, while vapors pass through line 112 to cooler 113 where the vapor temperature is lowered sufficiently to condense water, but leaving most or all of the mercaptans in the vapor phase. The resulting mixture is separated in receiving tank 114, water being withdrawn through line 115 and mercaptan vapors emerging through line 116.

Meanwhile pre-treated distillate from line 105, or else sour distillate in line 117, substantially free from acids having dissociation constants above about $10^{-5}$ is introduced from an outside source not shown through line 118 into extractor 119, where mercaptans are extracted with a suitable caustic alkali solution preferably containing a solutizer for mercaptans. This solution is introduced through line 120. Treated distillate emerges through line 121, and spent caustic alkali solution goes through line 122 to the top of oxidizer 123. Air enters the oxidizer near its bottom through line 124, and the light mercaptans in line 116 are admitted to the oxidizer at some suitable point. For instance, they may be admixed to the spent solutizer solution in line 122. Preferably, however, they are introduced at some point between the solution inlet and air inlet in oxidizer 123. It is further desirable, though not essential, that the air intake be split, a portion of the air being admitted through line 125 at a point just above the light mercaptan intake.

Concurrent flow of air and caustic alkali solution may be employed in the oxidizer if desired. In this case the spent caustic solution would be introduced at the bottom of the oxidizer.

Spent air is released through vent line 126. Oxidized solution passes through line 127 to separator 128 where organic disulfides are allowed to rise to the top. They are removed through line 129, and regenerated caustic alkali solution returns through lines 130 and 120 to the extractor 119.

The use of light free mercaptans to aid in the oxidation of heavy mercaptides rather than light alkali mercaptides is advantageous in that it makes possible a higher mercaptide concentration in the spent solution which is easier to oxidize without catalyst loss. Hence wherever possible, it is preferred to add the light mercaptans as such rather than in the form of mercaptides.

If desired, steam stripping and oxidation to regenerate a spent caustic alkali solution containing mercaptides may be combined in ways other than described above. For example, a spent solution containing heavy mercaptans may be steam stripped to remove a portion thereof. Light mercaptans are then added, and the mixture is further regenerated by oxidation. At times it may be possible to recover light mercaptans from those removed by steam stripping by subjecting the latter to fractional condensation or distillation.

I claim as my invention:

In a cyclic regenerative process for sweetening a sour hydrocarbon distillate containing a mixture of light and heavy mercaptans by extracting the mercaptans from the sour hydrocarbon with an aqueous caustic alkali solution containing a solutizer for the removal of relatively heavy mercaptans and wherein the resulting spent caustic solution is regenerated by oxidation with free oxygen catalyzed by an organic polyhydroxy compound, itself susceptible to oxidation, to produce a lean regenerated caustic solution for further extraction utility in the process, and wherein oxidation of the regeneration catalyst during oxidation regeneration is inhibited by providing a sufficient content therein of caustic alkali mercaptides corresponding to said light mercaptans when the mercaptides corresponding to the heavy mercaptans are substantially completely oxidized to disulfides, the improvement comprising: (1) pre-extracting the sour hydrocarbon with a partially regenerated caustic solution, produced as described hereinafter and containing a residual amount of mercaptides corresponding to the heavy mercaptans, to extract the light mercaptans from the sour hydrocarbon; (2) extracting the pre-extracted sour hydrocarbon resulting from step (1) with regenerated caustic alkali-solutizer solution from step (6) as hereinafter described to extract the heavy mercaptans; (3) partially regenerating the resulting spent caustic solution from step (2) by oxidation in the presence of the oxidation catalyst while leaving sufficient mercaptides therein to inhibit oxidation of the catalyst; (4) dividing the resulting partially regenerated solution into minor and major portions and utilizing the minor portion as the caustic extracting solution in step (1); (5) combining the major portion of the partially regenerated solution and the resulting spent minor portion containing extracted light mercaptans from pre-extraction step (1); and (6) regenerating the combined solution by oxidation of the heavy mercaptans and a portion of the light mercaptans while leaving only a residual amount of light mercaptans therein sufficient to inhibit oxidation of the catalyst.

References Cited in the file of this patent

UNITED STATES PATENTS

| | | |
|---|---|---|
| 1,853,353 | Jacobsen | Apr. 26, 1932 |
| 1,943,744 | Rosenstein | Jan. 16, 1934 |
| 1,998,849 | Schulze | Apr. 23, 1935 |
| 1,998,863 | Chaney et al. | Apr. 23, 1935 |
| 2,001,715 | Fischer | May 21, 1935 |
| 2,015,038 | Pevere | Sept. 7, 1935 |
| 2,164,665 | Rogers et al. | July 4, 1939 |
| 2,258,279 | Caselli et al. | Oct. 7, 1941 |
| 2,315,530 | Loyd | Apr. 6, 1943 |
| 2,316,092 | Loyd | Apr. 6, 1943 |
| 2,324,927 | Heilman | July 20, 1943 |
| 2,516,837 | Happel et al. | Aug. 1, 1950 |
| 2,589,663 | Bond | Mar. 18, 1952 |

FOREIGN PATENTS

| | | |
|---|---|---|
| 126,544 | Hungary | Mar. 17, 1941 |